United States Patent Office 3,703,440
Patented Nov. 21, 1972

3,703,440
PROCESS FOR THE PRODUCTION OF STARCH SYRUPS THAT HAVE FRUCTOSE ON THEIR MOLECULAR ENDS
Shigetaka Okada, Nara, and Naoto Tsuyama, Masashi Kurimoto, and Kaname Sugimoto, Okayama, Japan, assignors to Hayashibara Company, Okayama-shi, Okayama, Japan
No Drawing. Filed Nov. 9, 1970, Ser. No. 88,162
Claims priority, application Japan, Nov. 9, 1969, 44/89,514; Jan. 14, 1970, 45/3,976
Int. Cl. C13k 1/00
U.S. Cl. 195—31 R                    6 Claims

ABSTRACT OF THE DISCLOSURE

Process for the production of starch syrups which have oligo-glucosyl-fructose as their main constituents by subjecting amylase of *Bacillus macerans* to a mixture of solutions of liquefied starch and sucrose.

---

The present invention relates to a process for the production of starch syrups which have oligo-glucosyl-fructose as their main constituents by subjecting enzyme of *Bacillus macerans* on mixture solution of liquefied starch and sucrose.

The oligo-glucosyl-fructose mentioned in this invention are sugars of oligosaccharides which are bonded with sucrose on their reducing ends in $\alpha$-1,4-linkages. The formation of these oligosaccharides by subjecting mixture solutions of cyclodextrins and sucrose to the enzyme of *Bacillus macerans* is already known (D. French et al., J.B.C. 76, 2387, 1953). However this is the equilibrium reaction and thus it is impossible to transfer the cyclodextrins completely into sucrose by the reaction. The unreacted cyclodextrins, which are difficult to dissolve in water and apt to cause turbidity of the starch syrup products, can be removed by the employment of organic solvents, such as trichloroethylene, which becomes a problem in the food processing industry.

The inventors, perceiving the possible applications of such oligosaccharides as a high quality sweetener conducted various studies on this product and found that a process for the production of oligo-glucosyl-fructose comprising subjecting the enzyme of *Bacillus macerans* to mixture solutions of liquefied starch and sucrose and transferring the liquefied starch to sucrose could be accomplished without (hardly) causing formation of cyclodextrins.

Further, the invention investigated the sweetness and physical properties of the produced oligosaccharides and found that the products were superior and of high qualities with the following properties. The products had lower tendencies of coloration even by heating with protein or peptide, owing to their lower concentration degree of reducing sugar than common starch syrups, and were characterized in that they had a sweetness similar to bee honey.

The enzyme of *Bacillus macerans* has been known many years as an enzyme to form cyclodextrins. Cyclodextrins are produced on industrial scale employing the enzyme. However realizing that the action of this enzyme is essentially not a formation of cyclodextrins but a transfer action of sugars, the inventors conducted various studies and obtained the following results. The subjection of the enzyme on linear chained oligosaccharides, D.P. (represents the degree of polymerization) of over 10 approximately caused intra molecular transfer, disintegrated the oligosaccharides to oligosaccharides with six glucose residues and then effected formation of cyclomolecules, i.e. cyclodextrins. However on the subjection to oligosaccharides with lower D.P., les than 8, the inventors found that intra molecular transfer was not effected because of their lower D.P., and found that this caused no formation of cyclodextrins. Moreover the inventors found that in the presence of desirable sugar acceptors that the formed oligosaccharides transferred to the acceptors and a characterized transfer product was produced.

For sugar acceptors, glucose, maltose, maltobionic acid, cellobiose, turanose, panose, isomaltose and various glucosides are applicable, as well as sucrose. However for the purpose of the production of high quality sweeteners, the employment of sucrose was found most desirable.

Any variety of starches may be used; sweet potato starch, potato starch, amylose starch, waxy corn starch, corn starch, etc. Liquefied starch can be produced by liquefaction of those starches with acid or enzyme. The employment of commercial bacterial liquefying enzyme rapidly reduces the amount of higher molecular oligosaccharides over G 10 and accumulates oligosaccharides of around G 6, G 7, which are most effective in the following reaction. (G 6, G 7 and G 10 represent oligosaccharides with 6, 7 and 10 glucose residues, respectively.)

When the dextrose equivalent (D.E.) of starch obtained by liquefaction of starch employing enzyme is more than 10%, the subjection of the enzyme of *Bacillus macerans* hardly effects the formation of cyclodextrins. However it was found that some amount of cyclodextrins are obtained as by-products when D.E. of the liquefied starch is 7%. (Refer to Experimental 1 which will be described later.) Also in the case of acid liquefied starch with D.E. of over 10%, the action with *Bacillus macerans* hardly forms cyclodextrins, thus the liquefied starch is usable. (All parts and percentages are by weight unless stated otherwise.) Since the reaction is a transfer reaction, reactions may be performed with starch concentration D.S. 5–45%. (D.S. represents dry substance.) In case the starch concentration is over D.S. 45%, the reaction of the enzyme of *Bacillus macerans* tends to be slightly inhibited.

Though the sucrose concentration depends on the employed starch concentration, the production of oligo-glucosyl-fructose may be performed with sucrose concentration in the range of D.S. 1–60%. However in case the liquefied starch concentration is high and the sucrose concentration is relatively low, the liquefied starch can not completely transfer to sucrose, and has tendencies of hydrolysis and slightly increasing the amount of reducing sugars in the starch syrup products.

In case the sucrose concentration is increased higher than that of starch, although most of the starch transfers to sucrose, a large amount of unreacted sucrose still remains in the products. The starch syrups produced by each method have superiorities and are described in the experimental examples. The enzyme of *Bacillus macerans* applicable in the production of starch syrups described in the present invention are derived from the following that secrete amylase of *Bacillus macerans*: *Bacillus macerans* IFO 3490 (which belongs to Institute for Fermentation, Osaka, Japan), *Bacillus macerans* IAM 1227 (Institute of Applied Microbiology, Tokyo University, Tokyo, Japan, *Bacillus macerans* ATCC 8244, 7048, 7068, 8510, 8515). The strains are cultivated on mediums comprising soybean cake and corn steep liquor, at 30° C. for 3 days under shaking conditions. And the culture broth is filtered. The method of cultivation are widely known. Enzyme solution obtained by cultivating the strains on thin sliced pieces of potato at 40° C. while standing for two weeks, then filtering the resulting culture broth, is applicable in the process described in the invention. Of course the salting out preparations obtained by ammonium sulfate or other precipitation agents and enzymes purified by organic solvents can be also used in the process of this specification.

The activity of the filtered culture solution obtained by the above cultivation was normally 2–3 conversion units per ml. culture solution, which was determined by the method of Tilden & Hudson ("Starch Handbook," Revised Edition, p. 310; Editor, Jiro Nikuni; Publisher, Asakura Shoten). In the process 0.1–2 units enzyme preparation per gram starch is used. Starch syrups, that in most respects meet the requirements, are obtained by incubation for 1–3 days. The incubation is effected at around pH 6.0, in the range of 4.5–8.0. The range for temperature stability of the enzyme is up to approximately 50° C. The presence of liquefied starch which is used as a substrate stabilizes the enzyme up to 55° C. and thus reaction can be performed at up to this temperature.

Paperchromatography was performed with a very small amount of the produced starch syrup obtained by subjecting liquefied starch added with sucrose to the action of the enzyme of *Bacillus macerans*. The results of the assay are shown in Experimental 2. As evident from the results, the starch syrups, oligosaccharides of G2F, G3F and G4F bonded with sucrose on their reducing ends are present as well as maltooligosaccharides of G1, G2 . . . G10. (GF represents the glucosyl fructose residues.) In addition the products impart a characteristic sweetness which is unattainable from mixtures of conventional starch syrups and sucrose.

The desired starch syrups are obtainable by purification with active carbon and with ion exchanges if necessary, and vacuum concentration.

EXPERIMENTAL 1

Sixty grams of potato starch were suspended in 600 ml. of pure water and 600 units (Lintner-Sollied method) of bacterial liquefying enzyme were added. The mixture solution was gelatinized in a boiling water bath and then liquefied at 65° C. 100 ml. fractions were collected after 30, 60 minutes and 3, 6 hours of the liquefying reaction. After the residual enzyme activity of the reaction mixture was inactivated by heating, it was used as the liquefied starch solution. Then to each fractoin of 100 ml. was added 10 g. sucrose and 5 ml. Macerans enzyme (3 conversion units per ml.). The fractions were incubated at 40° C. for 2 days. At the end of the incubation, to 10 ml. of each fraction was added 1 ml. of trichloroethylene and shaked vigorously, then the existence of cyclodextrin formation was determined.

As shown in Table 1, no cyclodextrin was formed at D.E. over 10%.

TABLE 1

The relationship of dextrose equivalent of liquefied starch to formation of cyclodextrin

| Reaction time of liquefying enzyme | 30 min. | 60 min. | 3 hr. | 6 hr. |
|---|---|---|---|---|
| D.E. of liquefied starch | 4.0% | 7.0% | 16.4% | 19.7% |
| Cyclodextrin formation test | +++ | + | − | − |

NOTE. + represents amount of formation. − represents absence of cyclodextrin formation.

EXPERIMENTAL 2

The starch syrup which was produced with enzyme of *Bacillus macerans* after 3 hours of reaction with the liquefying enzyme as described in Experimental 1, was subjected to the paperchromatography test. The sample was developed four times by ascending method with a solvent system consisting of n-butanol:pyridine:water, 6:4:3 by vol. The developed chromatogram was visualized by the detecting reagent (Chromatography, p. 168, Author, IVOR Smith) and evident spots which may be considered as G2F, G3F, G4F as well as sucrose, were developed on the paper.

Because these spots could be converted with commercial saccharase to corresponding oligosaccharides and fructose, the spots were confirmed as G2F and G3F (respectively). On the other hand, the developed paperchromatogram under the same conditions was visualized by silver nitrate reagent which can detect only reducing sugars and the presence of glucose, and oligosaccharides of G2, G3, etc. were observed. In other words the starch syrup product is a mixture solution of oligosaccharides transferred to sucrose or their residues and common oligosaccharides.

The transferring actions of the above mentioned enzyme macerans between oligosaccharides and sucrose were tested with sugar in addition to sucrose. The tests resulted in the new findings that fructose was also transferred to oligosaccharides. More particularly the following fact was found. On 48 hrs. incubation of a mixture (concentration 23%) comprising one part of acid liquefied starch solution (dextrose equivalent, D.E. 13%, 22%) and one part of (on dry base) fructose or invert sugar containing fructose, isomerized dextrose, or molasses, hydrol, or date extract, with addition of the culture filtrate of *Bacillus macerans* at pH 6.0, 55° C., the liquefied solution hydrolyzed with the progress of time and the viscosity of the hydrolyzate solution was found reduced. With paperchromatogram on the sugar solution obtained after reaction, ketose was identified with phloroglucinol reagent and reducing sugar was identified with silver nitrate reagent. Spots of oligosaccharides of D.P. 2–8 were displayed as well as those of glucose and fructose. Spots of oligosaccharides bonded with fructose were exhibited distinctively at slightly higher position of RF values of oligosaccharides (D.P. 2–3), which was evidence that a substantial amount of fructose bond oligosaccharides were formed. The results obtained by quantitative analysis with paperchromatographic fractionation also showed that oligosaccharides with D.P. 2 were predominatingly present in the product. The increase of D.P. reduced production of transferred sugar as detected by the amount of fructose present and the main constituent of the product became sugars with D.P. of approximately 2–5. It was found that 10–50% of the original fructose was converted into transferred fructose.

Since the reaction is a transfer reaction, the reaction may be performed at high concentration, up to 10–45%. However when the concentration is elevated to about 50%, the action of the enzyme of *Bacillus macerans* tends to affect only slightly. On the other hand the concentration of the acceptor fructose or invert sugar, is relative to the concentration of the starch and thus the reaction can be performed a a concentration lower than 60%. However, in case the concentration of fructose is lower than that of liquefied starch, the liquefied starch transfers to fructose and moreover the degree of hydrolysis proceeds and exhibits a tendency of increasing the amount of reducing sugar. In case the ratio of fructose concentration/liquefied starch concentration increases, most of the liquefied starch naturally transfers to fructose and a large amount of intact fructose remains present in the product. Therefore, by varying the ratio of the two sugars (transferred fructose and intact fructose) specific starch syrups are obtainable.

Fructose or sugar mixtures containing fructose, in which both fructose are used as acceptors, and their reaction products will be described. When only fructose is present as acceptor in starch hydrolyzate (D.E. 15%, means D.P. 6.6), activated oligosaccharides and G7F, G6F . . . G1F which are fructose bond sugars, form the products which will contain oligosaccharides of G7–G1 and intact fructose.

In case the acceptor is a sugar mixture (invert sugar) of fructose and glucose, of course both fructose and glucose become transferred sugars (transferred fructose and transferred oligosaccharides), accordingly the final oligosaccharide contents remain unchanged. In case hydrolysis dominates transfer action on starch hydrolyzate, an increase of reducing sugar occurs. It was found by experiments that hydrolysis is superior as it increases the amount of reducing sugar by 1–2%.

When the acceptor is an invert sugar produced by partial hydrolysis and contains residual sucrose, the activated oligosaccharides transfer also to sucrose. However, if the linkage with fructose are 1, 2 as in the case, of sucrose, identification of transferred fructose and transferred sucrose is impossible. Because the amount of sucrose detected as fructose decreases, it proves that the transfer action effects the sucrose. In case the bond on which fructose transfers is not 2, two types of transferred oligosaccharides with different molecular structures, namely oligosyl sucrose and oligosyl fructose are formed. According to paperchromatogram, the existence of two types of transferred sugars is established the present.

Since date sugar, isomerized sugar produced by isomerase or alkali, or molasses are all mixtures of fructose and glucose or in some cases of fructose, glucose and sucrose, the same reduction products may be produced from the former sugars.

Since macerans enzyme is an amylase which has activity on dextrins, it is natural that α-1,6-glucoside bonds should be removed with simultaneous employment of α-1,6-glucosidase in performing transfer reaction on liquefied starch solution which contains a large proportion of branched dextrin. 10–20 units of enzymes from strains of Lactobacillus, Nocardia of Acetomycetes group, added before reaction or during reaction in order to select an enzyme which is heat resistant and has an optimum pH around 6.0, is desirable for industrial purposes. The tests resulted in the finding that addition of such enzymes proved very effective in facilitating the filtration procedure of the resultant mixture as well as in rendering their slight effectiveness to transfer reaction.

Dried products of these purified sugar solution (50–70%) hardly crystallized and were intensively sweet. The powdered products obtained by spray drying these 50–70% concentration sugar solution, are easy to handle and their hygroscopicities were relatively low.

EXAMPLE 1

500 grams of potato starch were suspended in 4.5 l. of pure water, 5000 units of bacterial liquefying enzyme were added, gelatinized in boiling water bath and then kept at 65° C. and reacted for 3 hours. When a disintegration degree (D.E.) of 16% was attained the reaction was discontinued by boiling the mixture. The mixture was then incubated at 40° C. for 2 days with 250 ml. of amylase solution of *Bacillus macerans* (3 conversion units/ml.) prepared separately after an addition of 500 g. of sucrose. At the initial stage of reaction, the reaction mixture imparted the specific smell of starch and the sweetness of sucrose. However with the progress of the reaction the starch smell gradually vanished and the sweetness became very near to that of honey. After the reaction 0.5% active carbon per dry solid was added to the product, decolorized, purified with ion exchanges and concentrated under reduced pressure, thus the final product was obtained.

The product was assayed by paperchromatography. It was found that about 15% of sucrose were transferred to oligosaccharides. The sweetness of the product was more intensive and the quality of sweetness was superior to sucrose. The product rendered a sweetness similar to that of honey.

EXAMPLE 2

The gelatinization, liquefaction and saccharification procedures were carried out under the same conditions described in Example 1, with the exception of reduction of the addition amount of sucrose to 50 g. Thus starch syrup, in which approximately 50% of sucrose was transferred to oligosaccharides, was obtained. The purified and concentrated product was transparent and colorless.

EXAMPLE 3

The process was carried out as described in Example 1 with the employment of 500 g. of soluble starch and 750 g. of sucrose. The final resultant mixture was decolorized and purified to obtain a transparent and colorless starch syrup. The product had an intensive sweetness comparable to sucrose and body. The concentrated product was highly heat resistant, colorless and transparent.

EXAMPLE 4

To a sweet potato slurry (concentration, 40%, pH 6.0) was added 0.2% liquefying enzyme, it was continuously liquefied at 85–90° C., and hydrolysis was affected at 80° C. Thus a liquefied solution of D.E. (D.E. represents dextrose equivalent) 13.4% and 22.6% was obtained. Following inactivation of the liquefying enzyme by heating, 2 units of culture broth of *Bacillus macerans* per gram strach and 10 units of α-1,6-glucosidase of *Lactobacillus plantarium* ATCC 8008 per gram starch were added to the resultant. Fructose solution, calculated on dry base and equivalent to ⅓ of starch was added simultaneously to give the final concentration of 40%. The mixture was then incubated at pH 6.0, 55° C. for 72 hours. At the end of incubation, the resultant sugar solution was boiled to inactivate the enzyme present, decolorized with the addition of active carbon (0.4% per solid), filtered, deionized and decolorized by passing the liquid through a three bed type ion exchanger, containing IR 200, IRA 69, IR 200–IRA 411 (ion exchange resin produced by The Japan Organo Co.), and then concentrated. Filtration procedure and others were performed with greater ease than in the cases when α-1,6-glucosidase was not added. In addition the resultant can be formed into powder (moisture 1–3%) of relatively low hygroscopicity, by using spraydrying equipment.

The starch syrup thus obtained was colorless, odorless and had a sweetness close to that of sucrose, but more decent. At room temperature the product did not crystallize at a concentration of 75%.

The starch syrup was subjected to paperchromatography and it was developed four times by ascending method with the solvent system consisting of $$\text{pyridine:butanol:water} = 4:6:3$$

and then ketoses were detected with phloroglucinol reagent. Then each fraction cut from the paper was extracted. Fructose was determined quantatively by cysteincarbazol method. Transferring percent was calculated by the following equation:

Transferring percent $$= \frac{\text{total fructose of oligoglucosyl fructoses}}{\text{total fructose in the reaction mixture}} \times 100$$

The results are shown in Table 2. The transferred percentage of solution for liquefied solutions of D.E. 13% and 22% were 50.2% and 40.8%, respectively. Formation of cyclodextrins were slightly detected at D.E. 13%, however, not detected at D.E. 22%. In the latter case, the product was transparent.

EXAMPLE 5

Reaction was carried out using purified sweet potato starch under the same conditions described in Example 4. The amount of fructose used was equivalent to that of starch on dry base. The mixture was adjusted to give a final concentration of 40%. The product was sweeter than the product according to Example 1. From the results of paperchromatography as shown in Table 2, reduction of transferring percentage and tendency of increase in the amount of residual fructose were observed. Although in the case of liquefaction degree of 13%, the transferring percentage increased, the effected formation of about 1% of cyclodextrins and the starch syrup product were not desirable. Moreover in this example the addition of 15 units of α-1,6-glucosidases of Lactobacillus per gram starch with simultaneous addition of macerans enzyme resulted in an increase of 2-3% in the transferring percentage and reducing filtration time 20-50%.

EXAMPLE 6

A purified potato starch slurry was adjusted to give a concentration of 45%, oxalic acid 0.2% per starch was added and the mixture was heated in a converter at 2 atm. for 10-15 minutes. The reaction was suspended when the mixture attained D.E. 20. Then the resultant was neutralized to pH 5.0 using calcium carbonate, and filtered, to yield a very viscous liquefied solution. An equivalent amount of invert sugar (dry base) which contained sucrose 34%, and 2 units of macerans amylase per gram starch was added to give a final concentration of 45%. Following 60 hours of incubation of the mixture at pH 6.0, at 55° C., the mixture was boiled to inactivate the enzyme present, decolorized with active carbon powder and deionized and decolorized with ion exchange resins in accordance with the method described in Example 4.

Thus a colorless and transparent starch syrup was obtained. The product had a decent sweetness similar to that of fructose and sucrose. No deposit of crystals was exhibited. Results of quantitative assay of each sugar by paperchromatography are shown in Table 2. The amount of sucrose decreased, the results showed a substantial formation of oligoglucosyl fructose and no formation of cyclodextrins was observed. These transferred sugars render a decent sweetness and simultaneously inhibit crystallization.

EXAMPLE 7

The potato starch was liquefied with oxalic acid following the method described in Example 6 to D.E. 20, and neutralized. An equivalent amount (dry base) of invert sugar, in which sucrose was absent, was added and then transferred with macerans amylase. The transfer reaction was performed at pH 6.0, concentration 45%, 55° C. for 60 hours, and then suspended by boiling. The resultant was decolorized and deionized employing active carbon and ion exchange resins and then concentrated. The product starch syrup was similar to that obtained in Example 5. Since the quality of sweetness relate to fructose, the product had a very intensive sweetness, and the transferred sugars exhibited a decent sweetness. Crystallization caused by invert sugar was substantially inhibited, and showed no crystallization even at high concentration, 70-75%. In addition heat resistance of the product tended to be stabilized with the reduction of the percentage of fructose.

EXAMPLE 8

Tapioca starch slurry was liquefied to D.E. 20 by heating at 2 atm. with an addition of 0.2% per gram starch of oxalic acid, followed by purification and controlling a concentration of 40%. The liquefied starch was neutralized, filtered, then three fold (per starch) of invert sugar was added which contained 34% sucrose and 2 units of macerans amylase per gram starch, final concentration was adjusted to 35% and then it was incubated at pH 6.0. 55° C. for 48 hours. the resultant was purified with active carbon and ion exchange resins in accordance with usual methods, concentrated, then a colorless, odorless, and transparent starch syrup was obtained. Although the transferred percentage of the product was low, around 15%, the product consisted of various oligosacchrides and oligoglucosyl fructose as well as fructose and sucrose. The product hardly crystallized and could be handled as high concentration sugar syrup. Since the product had an intensive but mild sweetness, it is preferable for the production of various confectioneries.

EXAMPLE 9

Corn starch was washed and adjusted to a concentration of 35%, pH 5.0, charged into a continuous liquefier equipped with multi blades, in which raw steam was charged, heated at 150-170° C. for 10 minutes, gelatinized sufficiently and then cooled rapidly to 80° C. Before degradation occurred, 15 units of liquefying enzyme per gram starch was added to the product and it was pumped into a holding tank at pH 6.0 and 80° C., where the enzyme present in the starch solution was inactivated by heating upon attaining D.E. 19%, then cooled to 60° C. After adding three times amount (to starch) of date extract solution (fructose:glucose=50:50); the liquefied solution was incubated with the addition of macerans amylase at a concentration of 45%, 55° C. and pH 6.0 for 48 hours. The reacted solution was similarly purified, concentrated after boiling and then a colorless and transparent starch syrup was obtained. Paperchromatography of the product resulted as described in Example 7 with hardly any significant differences. Also no significant differences were observed with respect to intensity and quality of sweetness. Attention should be taken to liquefaction: liquefaction at a high temperature of about 160° C. is preferable, in case degradation cannot be prevented by liquefaction because this reduces the time of filtration during the purification procedure.

EXAMPLE 10

Corn starch (concentration 40%) was liquefied with oxalic acid to D.E. 20 as described in Example 6, neutralized with calcium carbonate, precipitated and filtered. Two fold of invert sugar containing 34% of sucrose per starch was added to give a final concentration of 45%, then reacted at 55° C., pH 6.0 for 2 days. Thus a transparent starch syrup similar to the one obtained in Example 8, was obtained. As shown in Table 2, the product contained oligoglucosyl fructose and oligosaccharides as well as fructose and sucrose. The product was intensively sweet and a desirable sweetener of fine flavor.

EXAMPLE 11

Sago starch was purified, liquefied with oxalic acid at a concentration of 40% and treated as described in Example 7. To the resultant (D.E. 22%) was added 3 parts (dry base) of sugar solution obtained by isomerizing glucose employing isomerase of *Lactobacillus brevis* and contained fructose 39% per total sugar. The mixture was transferred with the amylase of *Bacillus macerans*. The product obtained on purification had a slight yellow tint, and a sweetness more intensive than that of the product of Example 7 and its crystallizability was sufficiently inhibited; crystals did not deposit at high concentration, 70-75%. As apparent from the results of paperchromatography give in Table 2, although the product is similar to invert sugar, its transfer percentage is lower.

EXAMPLE 12

Corn starch was liquefied with acid to D.E. 21% after purification and adjusting to a concentration of 30% and pH 6.0. To the resultant was added 3 parts of honey per part of starch to give a final concentration of 35%, then incubated with 3 units of macerans amylase per gram starch at 55° C., pH 6.0 for 60 hours. Upon completion of the reaction, the resultant was purified, decolorized and deionized with active carbon and ion exchange resin, and a slightly yellow starch syrup was obtained. It exhibited a sweetness and flavor, similar to that of honey, and rendered a sweetness with body, crystals did not deposit during winter even when it had a concentration of 70%. No formation of turbidity was caused by cyclic dextrins as evident from the assay results shown in Table 2. Thus the product is a desirable for the confectionery industry.

EXAMPLE 13

Three parts of molasses (sucrose 25%, fructose and glucose 75%) was added to each part of the liquefied solution of corn starch (D.E. 23) prepared in accordance with Example 12. The reaction mixture was adjusted to a concentration 45%, was incubated at pH 6.0, 55° C. for 60 hours, and decolorized with minor difficulty. Thus a nearly identical product to the product of Example 10 was obtained. The process is characterized in providing an intensive sweetness and improved flavor using the sucrose sugar mixture.

TABLE 2

| Example No. | 4 | 5 | 6 | 7 | 9 | 10 | 11 | 12 |
|---|---|---|---|---|---|---|---|---|
| Kinds of starches used | Sweet potato starch. | Sweet potato starch. | Potato starch. | Potato starch. | Corn starch. | Corn starch. | Sago starch. | Corn starch. |
| Methods of liquefying | Enzyme | Enzyme | Acid | Acid | Enzyme | Acid | Acid | Enzyme. |
| Dextrose equivalent (D.E.) | 13.4 | 22.6 | 20.0 | 20.0 | 19.0 | 20.0 | 22.0 | 21.0 |
| Sugars mixed for acceptors | Fructose. | Fructose. | Fructose. | Fructose. | Invert sugar (S34). | Invert sugar (S0). | Date syrup. | Invert sugar (S34). | Glucose isomerising syrup. | Honey. |
| Sugar ratio to starch, parts | ⅓ | ⅓ | 1 | 1 | 1 | 1 | 3 | 2 | 3 | 3. |
| Free F | 49.8 | 59.2 | 65.0 | 77.5 | 55.1 | 73.0 | 74.9 | 60.1 | 84.0 | 83.5. |
| F of $G_1F$ (equivalent to sucrose) | 12.0 | 10.9 | 10.5 | 8.3 | 18.8 | 9.4 | 8.8 | 19.5 | 6.2 | 6.1. |
| Fructose contents, percent: | | | | | | | | |
| F of $G_2F$ | 11.8 | 8.1 | 8.6 | 6.0 | 6.9 | 6.3 | 6.0 | 5.9 | 3.9 | 3.5. |
| F of $G_3F$ | 7.2 | 6.5 | 5.9 | 3.1 | 5.1 | 4.1 | 4.1 | 4.1 | 2.8 | 2.8. |
| F of $G_4F$ | 19.2 | 15.3 | 10.0 | 5.2 | 14.1 | 7.2 | 6.2 | 10.4 | 3.1 | 4.1. |
| Transferred ratio, percent | 50.2 | 40.8 | 35.0 | 22.5 | 26.1 | 27.0 | 25.1 | 20.4 | 16.0 | 16.5. |
| Cyclodextrins | 1 | 0 | 1 | 0 | 0 | 0 | 0 | 0 | 0 | 0. |

NOTE.—F represents fructose, S34 represents invert sugar containing sucrose of 34%, S0 represents invert sugar containing no sucrose residue.

What we claim is:

1. A process for the production of starch syrups containing oligoglucosyl fructose, comprising adding a sugar mixture containing sucrose, fructose, or a mixture of sucrose and fructose as an acceptor to a liquefied starch solution having a D.E. of over 10 and then subjecting the mixture to the action of amylase from *Bacillus macerans* to produce a cyclodextrin free syrup.

2. A process according to claim 1, wherein the amylase used in said transferring action is an enzyme from *Bacillus macerans* IFO 3490 or IAM 1227, ATCC 8244, 7048, 7068, 8510, 5815.

3. A process according to claim 1, wherein the employed acceptor is selected from the group consisting of invert sugar, partially inverted sugar, isomerized glucose, date sugar, honey, molasses and hydrol.

4. A process according to claim 1, wherein α-1,6-glucosidase is used simultaneously with amylase from *Bacillus macerans* as a debranching enzyme.

5. A process according to claim 3 wherein sucrose is used as acceptor.

6. Non crystallizing, highly sweet starch syrups produced by the process of claim 3.

References Cited

French et al., J. Am. Chem. Soc., vol. 76, pp. 2387–90, 1954.

Thoma et al., Starch: Chem. and Tech., by Whistler et al., Academic Press, pp. 238–40, 1965.

Bernfeld, P., Adv. in Eng., vol. XII, Interscience Publishers, Inc., pp. 419–20, 1951.

A. LOUIS MONACELL, Primary Examiner

G. M. NATH, Assistant Examiner

U.S. Cl. X.R.

99—142

UNITED STATES PATENT OFFICE
CERTIFICATE OF CORRECTION

Patent No. 3,703,440     Dated November 21, 1972

Inventor(s) Shigetaka OKADA et al

It is certified that error appears in the above-identified patent and that said Letters Patent are hereby corrected as shown below:

Column 5, line 13, after "established" insert -- up to --

Column 8, line 68, after "desirable" insert --sweetener --

Signed and sealed this 15th day of May 1973.

(SEAL)
Attest:

EDWARD M. FLETCHER, JR.
Attesting Officer

ROBERT GOTTSCHALK
Commissioner of Patents